United States Patent Office 3,318,660
Patented May 9, 1967

3,318,660
METHOD OF PRODUCING PHOSPHATES
Josef Cremer, Hermulheim, near Cologne, Fridolin Hartmann, Urfeld, near Bonn, Franz Rodis, Bad Hersfeld, and Arnulf Hinz, Knapsack, near Cologne, Germany, assignors to Knapsack-Griesheim Aktiengesellschaft, Knapsack, near Cologne, Germany, a corporation of Germany
No Drawing. Filed Mar. 16, 1962, Ser. No. 180,309
Claims priority, application Germany, Mar. 22, 1961, K 43,259
8 Claims. (Cl. 23—107)

The present invention relates to a method of producing phosphates with the simultaneous production of volatile inorganic acids by reacting crude phosphates and the corresponding salts of readily volatile inorganic acids with non-volatile inorganic acids.

Reactions of crude phosphates with non-volatile inorganic acids have been known for a long time, for instance in the fertilizer industry. In the manufacture of superphosphate by the digestion of crude phosphate with sulfuric acid and/or phosphoric acid, the digestion mixture passes through a slurry-like to plastic state, which results in considerable difficulties from an apparatus standpoint for the working-up of the mixture. For this reason, very different measures have already been proposed, such as a step-wise digestion or the maintenance of specific acid concentrations, temperatures and times of reaction, inter alia, in order to carry out the digestion in a continuously pulverulent state.

It is furthermore known to produce from alkali halide, crude phosphate (phosphate rock) and phosphoric acid a mixed fertilizer which, due to its relatively low water content, does not smear but can be converted into a granulated product by drying in a rotary drum. In this connection, the splitting off of hydrogen halide is avoided by certain additions, for example $CaCO_3$, $MgO$, $MgCO_3$ and $NH_3$.

It is also known to split hydrogen chloride and fluoride from a mixture prepared from mineral phosphate, alkali chlorides and phosphoric acid, but this takes place only at 800° C., with the addition of silicic acid and the action of steam on the reaction mixture.

These known methods do not result in the production of pure phosphates, but are directed to the production of fertilizers in which the phosphates constitute only a certain percentage, and which are otherwise contaminated by a number of reaction products from the phosphate rock (crude phosphate).

Nor was it heretofore customary to react phosphate rock with, for instance, alkali metal salts in amounts necessary for the obtaining of alkali metal phosphates, i.e., in approximately stoichiometric amounts. Insofar as alkali metal salts are admixed at all to the crude phosphate, this was effected in substantially less than stoichiometric amounts, and solely for the purpose of increasing the solubility of the fertilizer.

It has now been found that stoichiometric reaction mixtures of phosphate minerals, of salts of volatile acids and of non-volatile free acids can be maintained during and/or after the digestion in compact, pulverulent, non-sticky or only slightly sticky consistency, whereby the difficulties in working a reaction mixture in slurry form are avoided.

In contradistinction to the known methods, it is possible by simple heating of the solid reaction mixture, even at temperatures of 200 to 600° C., to expel almost completely the free volatile acids, whereupon the reaction mixture is extracted with inorganic and/or organic solvents in order to recover the phosphates. Another possibility of removing or recovering the free volatile acids is first of all to treat the solid reaction mixture by extraction and then to heat the dissolved phosphorus salts after drying at temperatures below 600° C., and simultaneously melt them.

In this connection, the initial components can vary within certain weight limits, for instance ±10%. Deviation of the quantities by weight by more than ±15% from the stoichiometric relationships cause the process to become unprofitable.

The following theoretical reaction equations illustrate the main reaction (Equations 1 to 5), and the reactions of the impurities in the phosphate mineral (Equations a-c).

(1) $Ca_3(PO_4)_2 + 3H_2SO_4 + 2NaCl \rightarrow$
$2NaH_2PO_4 + 2HCl + 3CaSO_4$ (2) $Ca_3(PO_4)_2 + 3H_2SO_4 + 2KNO_3 \rightarrow$
$2KH_2PO_4 + 2HNO_3 + 3CaSO_4$ (3) $Ca_3(PO_4)_2 + 3H_2SO_4 + CaCl_2 \rightarrow$
$Ca(H_2PO_4)_2 + 2HCl + 3CaSO_4$ (4) $Ca_3(PO_4)_2 + 3H_2SO_4 + x.H_3PO_4 + x.2NaCl \rightarrow$
$x.2NaH_2PO_4 + x.2HCl + 3CaSO_4$ (5) $Ca_3(PO_4)_2 + 2H_2SO_4 + 2H_3PO_4 + 2KCl \rightarrow$
$2KH_2PO_4 + Ca(H_2PO_4)_2 + 2HCl + 2CaSO_4$ (a) $CaF_2 + H_2SO_4 \rightarrow H_2F_2 + CaSO_4$
(b) $CaSiO_3 + H_2SO_4 \rightarrow SiO_2 + CaSO_4$
$3H_2F_2 + SiO_2 \rightarrow 2H_2O + H_2SiF_6$
(c) $CaCO_3 + H_2SO_4 \rightarrow H_2CO_3 + CaSO_4$ The degree of calcination of the originally formed acid metal phosphates, as is known, increases with an increase in the temperature of reaction so that both the heated reaction mixture which has been freed of volatile acids and the phosphate melt contains condensed phosphates.

The measures which make it possible to maintain the reaction mixture of the starting materials in compact and/or pulverulent non-tacky or only slightly tacky state during and/or after the digestion are as follows: The starting materials are used in finely divided state, i.e., with a large surface, the mineral phosphate and salt of the volatile acid being present for instance in a particle size of less than 0.2 mm. In this connection, it has proven advantageous to crush the two solids together whereby there is simultaneously obtained a complete mixing. The non-volatile, free acids can be brought into the desired fine state of division by spraying.

Surprisingly, it has now been found that these aqueous acids can be used in concentrated form without detrimentally affecting the consistency of the reaction mixture. Another possibility of assuring a solid reaction mixture consists in carrying out the mixing and crushing and thus the increasing and renewal of the surface of the reaction components simultaneously, for instance in an apparatus of the edge-runner type, a mortar mill or a kneader. Furthermore, the desired nature of the reaction mass can be improved by the addition of return material, i.e., reaction product from previous reactions, which has possibly been previously ground. Furthermore, the method can be carried out step-wise, so that first of all only a part of the acid is added, whereupon the heating referred to below is effected, and the preliminary product obtained in this manner is possibly ground and reacted with the rest of the acid.

From the wet digestion of the crude phosphate with sulfuric acid, it is known that a complete reaction in an economical period of time is dependent on the presence of a considerably excess of acid which is provided in actual practice by the use of the so-called wash acid. It is clear that in the method described, the function of the excess acid can be readily assumed by the volatile free acids remaining in the reaction mixture in case of low temperatures and relatively short mixing time. In this connection, it should also be mentioned that it has proven very advantageous in order to obtain high yields of phosphate to allow the reaction mixture to age for a time at normal or elevated temperature in order to complete the digestion.

By the application, effected to a suitable extent, of the measures described above, a weak, sticky condition of the reaction mixture can also be produced thus avoiding a continuous slurry-like condition, in which connection the tendency of this reaction mixture to agglomerate can be utilized by means of suitable apparatus for the pelletizing. In this way, substantial simplifications can be obtained, inter alia, both in the subsequent heating and in the extraction.

It has been found that the reaction mixtures or phosphate melts obtained by the application of the above measures, give off their entire content of volatile acids at temperatures below 1200° C. and preferably 200 to 600° C. The heating can be carried out in known apparatus, for instance indirectly and/or directly heated rotary kilns, in accordance with the countercurrent or parallel flow principle. The furnace atmosphere can exert a reducing or oxidizing action, and furthermore steam in addition can be employed. In this way it is possible to exert an influence on the removal and/or solubility of compounds which, as contaminating elements coming from the mineral phosphate, are undesirable in the final product, such as fluorine, silicon, iron and arsenic. The recovery of the volatile components is effected in accordance with known absorption processes.

If the reaction mixture is heated before the extraction, the furnace products show a porous structure with a sintered matrix. If a prior pelletizing is effected, the original form can be retained, due to good inherent strength. Corresponding to the treatment in the furnace and/or in subsequent apparatus, the products of the heating can be obtained in coarse to finely granular or finely pulverized form. In order to obtain shorter extraction times and high yields, a small particle size, for instance below 0.2 mm. is desirable. The calcium sulfate is present in easily filterable form after the phosphates have been leached out. This particle size can be obtained by effecting a mechanical crushing of the reaction material during and/or after the heating.

The aging and the expulsion of the readily volatile acids can be carried out with continuous transition between them in a single method stage.

The products of the heating or practically free of volatile acids and, depending on the furnace temperature and the time of stay therein, contain mixtures of, for instance, alkali mono-, poly- and metaphosphates. The solubility of the condensed phosphates can be favored by quenching. Monophosphates are readily soluble compounds; oligophosphates are decomposed hydrolytically to monophosphates, preferably in the hot and in acid medium. Without special measures being necessary, this degradation in the present process is favored by the fact that on the one hand the necessary heat is supplied by the quenching of the reaction products and that on the other hand, the acid medium is created by a possible relative excess of phosphoric acid.

Also in the method steps of the extraction of the reaction mixture before and/or after the heating, and after dissolving the phosphate melt, an extensive selective leaching out, and/or stepwise precipitation can be obtained by the simultaneous or successive use of different inorganic and/or organic solvents, or their mixtures, as well as by the variation of parallel-flow or counter-flow principle, concentration, temperature, pressure and pH of the extraction agent or solvent with the purpose of recovering the phosphates present in the solution in the desired purity. The further working of the solutions into solid phosphates, for instance pyro- and/or tripolyphosphate, can be effected in known manner, for instance in a spray dryer. So-called hexametaphosphate, for instance Graham salt, is present to the extent of more than 90% in the phosphate melt immediately after the quenching.

It has also unexpectedly been found that according to the process described there may be prepared in the same manner as the phosphate of an alkali metal and/or alkaline earth metal also ammonium phosphates or mixtures of ammonium phosphates on the one hand and phosphates of an alkali metal and/or alkaline earth metal on the other hand as well as volatile inorganic acids provided that the salts of the alkali metals and alkaline earth metals of readily volatile inorganic acids are at least partially replaced by the corresponding ammonium salts.

As ammonium salts of readily volatile inorganic acids there may be used $NH_4Cl$, $NH_4NO_3$ or others, singly or in admixture with the salts of alkali metals or alkaline earth metals.

When carrying out the methods as described above, the main amounts of the volatile inorganic acids are liberated immediately upon mixing the reactants while said inorganic acids are obtained, for example, as aqueous products which are, moreover, contaminated, for example, with fluorine and arsenic compounds derived from the crude phosphates.

It has now been found, in addition, that the volatile inorganic acids can be obtained in a dry and pure state by altering the sequence of mixing the basic substances by reacting first the respective salt of an alkali metal, alkaline earth metal or the ammonium salt or a mixture of said salts with the non-volatile inorganic acids. The readily volatile inorganic acids are liberated from the salts and can thus be obtained in the pure state. Then the remaining salt solution including, for example, excess amounts of sulfuric acid, is converted with the crude phosphate to phosphates of the alkali metals, alkaline earth metals and ammonium phosphates or the mixtures thereof. This is accomplished by mixing the salt solution with the crude phosphate and allowing the reaction mixture to age in known manner, expelling the residual portions of readily volatile inorganic acids at temperatures below 1200° C. and extracting the reaction product.

The operation is advantageously carried out in such manner that either the total amount of the readily volatile inorganic acids is not expelled in the first stage, or the mixture of the crude phosphate with the salt solution obtained from the first process stage is again admixed with a certain amount, for example 25% of the total amount of the salts of volatile inorganic acids applied, since the digestion of the crude phosphate takes place much more rapidly and completely owing to the partially excess amounts of volatile acids contained in dissolved form in the mixture.

Thus it is possible, for example, to obtain in the production of sodium phosphates from crude phosphate, NaCl and concentrated sulfuric acid, in addition pure, dry hydrogen chloride by converting the calculated amount of sodium chloride at least partially with sulfuric acid of 98% strength to dry, pure hydrogen chloride and $NaHSO_4$ and subsequently converting the mixture obtained of $NaHSO_4$ and sulfuric acid, which is present in the form of a solution or a suspension, with the crude phosphate to sodium phosphate.

The method for the production of phosphates with the simultaneous obtaining of volatile inorganic acids according to the present invention consists in detail in converting crude phosphates and the salts of readily volatile inorganic acids with non-volatile inorganic acids by mixing the said components in approximately stoichiometric amounts and in a finely divided form intimately with one another and allowing them to react at normal or elevated temperature. Then the reaction mass obtained which is compact or pulverulent and non-sticky or only slightly sticky is heated to temperatures below about 1200° C. in which operation the readily volatile acid portions escape, and the soluble phosphorus salts are extracted by means of a solvent and evaporated to dryness or conducted to stations for the production of condensed phosphates by known methods. In the aforementioned operation, the heating to temperatures below 1200° C. may be carried out directly after the mixing of the starting components. On the other hand the reaction mixture, according to the invention, may be allowed to age at temperatures up to about 200° C. following the period of reaction which takes place at normal or elevated temperature. In order to expel the volatile acid portions, the reaction mixture is advantageously heated to temperatures within the range of about 200° to 600° C.

According to another feature of the present invention, there is reacted in the first stage the salt of the readily volatile inorganic acid with the non-volatile inorganic acid, in the course of which process the readily volatile inorganic acid escapes in a dry and pure form, while subsequently the reaction product obtained is mixed and allowed to react with the crude phosphate. In general the readily volatile inorganic acid is only partially expelled from its salts in the first process stage. However, after the readily volatile inorganic acid has been totally expelled in the first process stage, the remaining salt solution may subsequently again be admixed with a small amount of the salt of the readily volatile inorganic acid.

According to the invention, the extraction may also be carried out directly after the reaction which follows the mixture of the starting components and takes place at normal or slightly raised temperature, the volatile acid portions being expelled by heating only after the extraction stage.

The mixture of the reaction components can be carried out according to known pelletizing processes.

In the working method described above according to the present invention there are used for the preparation of ammonium phosphates and/or phosphates of an alkali metal or alkaline earth metal as salts of the readily volatile acids the chlorides and/or nitrates of ammonium, of alkali metals or alkaline earth metals or corresponding salt mixtures. Especially when using ammonium salts, the reaction mass is heated prior to the extraction only to temperatures below 800° C. As non-volatile acids there are preferably used sulfuric acid and/or phosphoric acid. The amounts by weight of the substances applied may deviate up to ±10% from the stoichiometric relationships. The non-volatile acids, especially sulfuric acid, are in general applied in a slight excess amount.

The extraction of the phosphates is carried out by means of inorganic and/or organic solvents, singly or in mixture, at normal or elevated temperature and, if necessary, under superatmospheric pressure. For this process there are used water and/or alcohols such as methanol, butanol or the like as extraction agents. The extraction is carried out at temperatures up to about 150° C. and under pressures ranging from atmospheric pressure to about 10 atmospheres gage. By adjusting the ratios of the concentration and/or the pH value step-wise during and/or after the extraction or after the processing of the phosphate melt, contaminations are precipitated totally or partially, or are not dissolved.

The heating to higher temperatures necessary for expelling the volatile acids is carried out according to the counter-current or parallel flow principle by means of direct and/or indirect heating. The heating according to the process of the present invention can be carried out in a reducing or in an oxidizing atmosphere. The heating can be carried out, for example, with an excess of air or carbon monoxide. There may simultaneously be added water vapor. During and/or after the heating the reaction material is crushed by mechanical means. The products obtained by the heating may be quenched.

The solid starting components are present, according to the invention, in particle sizes below about 0.2 mm. The solid starting components are advantageously crushed together. The non-volatile inorganic acids are added, for example, by spraying in a finely divided form. There may also be added return material to the reaction mass, i.e. reaction products from former conversions, possibly in the crushed state.

According to another feature of the invention the process is carried out step-wise by adding first only part of the non-volatile inorganic acid and reacting the product obtained after the heating, if necessary after crushing, with the remaining amount of the difficultly volatile acid.

The present invention is not restricted solely to the production of the phosphates mentioned in the following examples which serve to illustrate the invention, but other phosphorus salts can also be recovered in this manner, depending on the selection of the starting substances and the extraction agents, the parts being by weight:

Example 1

50 parts of cola-phosphate (38% $P_2O_5$) were ground with 15 parts of rock salt (NaCl) to a particle size of less than 0.2 mm. The mixture was mixed intensively with 48 parts of concentrated sulfuric acid (96%). The pulverulent reaction product was heated in a stream of air to 450° C. within 35 minutes, and the total hydrogen chloride thus removed. The product after heating was extracted twice with the same quantity by weight of water for 2 hours at 90° C., sodium phosphate passing into solution. The yield of soluble $P_2O_5$ was 85%, referred to the $P_2O_5$-content of the crude phosphate.

Example 2

50 parts of cola-phosphate (38%) were mixed intimately for a short time with 16 parts of rock salt and 52 parts of concentrated sulfuric acid (96%). The aging, until completion of the digestion, was effected by heating to 120° C. in one hour. After heating to 500° C., the hydrogen chloride was expelled in 15 minutes. The product after heating was ground to less than 0.2 mm. and extracted as above. The solution contained in the form of sodium phosphate 92% of the $P_2O_5$ contained in the mineral phosphate.

Example 3

50 parts of ground cola phosphate of less than 0.2 mm. (38%) were mixed with 15 parts of ground rock salt of less than 0.2 mm. and 50 parts of concentrated sulfuric acid (95%). The aging was effected for two hours at 150° C. The reaction product was extracted in the cold with 150 parts of water. After drying, the acid sodium phosphate was heated within the course of 35 minutes to 600° C., and thereupon quenched. The chloride-free sodium phosphate melt contained 90% $P_2O_5$ of the crude phosphate content.

Example 4

50 parts of Morocco phosphate were ground and simultaneously mixed with 18 parts of potassium nitrate having a particle size larger than 0.2 mm. 51 parts of concentrated sulfuric acid (92%) were added to this mixture, while mixing intimately. The mixture was allowed to age for 6 hours at 120° C. After heating to 400° C. and 15 minutes time of stay at this temperature, the nitric acid was completely expelled. The reaction product was extracted with the same amount by weight of water in 6 hours at 90° C. After filtering off the calcium sulfate, the solution contained 92% of soluble $P_2O_5$, calculated on the crude phosphate.

Example 5

50 parts of Morocco phosphate and 14 parts of sodium nitrate were ground to a particle size of less than 0.3 mm. and mixed intimately with 49 parts of concentrated sulfuric acid (94%). The reaction product was extracted with 100 to 150 parts of water. After the temperature rise to about 100° C. was complete the calcium sulfate obtained was filtered off and the solution evaporated to dryness. The residue was heated within the course of 15 minutes to a temperature of 650° C. with complete removal of the nitric acid. The melt obtained contained 90% $P_2O_5$, calculated on the Morocco phosphate applied.

Example 6

5 parts of rock salt were slowly introduced into 47 parts of concentrated sulfuric acid (96%) while simultaneously raising the temperature of the solution to 80° C. In this operation the hydrogen chloride, formed as a readily volatile inorganic acid, was obtained in a dry and pure form, i.e. it did not contain contaminations such as, for example, fluorine or arsenic which may originate from the crude phosphate when mixing the basic components simultaneously. After the hydrogen chloride had been expelled completely, the solution was mixed carefully with 50 parts of Morocco phosphate which had previously been ground together with 5 parts of rock salt to a particle size larger than 0.2 mm. The mixture was allowed to age at 100° C. for 12 hours. The remaining amount of hydrogen chloride was expelled at 400° C. within the course of 10 minutes. In order to extract the sodium phosphate, the reaction product was treated with the same amount by weight of water at 95° C. for 7 hours. After filtering off the calcium sulfate, 86% of the content of crude phosphate—$P_2O_5$—were dissolved.

Example 7

14 parts of potassium chloride were introduced into 46 parts of concentrated sulfuric acid (98%) at normal temperature. After the evolution of hydrogen chloride had ceased, 7 parts of water were added to the solution which was then intimately mixed with 50 parts of Morocco phosphate. The mixture was allowed to age for 18 hours at about 100° C. The expulsion of the remaining amount of hydrogen chloride and the extraction of the potassium phosphate were carried out as described in Example 6. The yield of soluble $P_2O_5$, calculated on the content of $P_2O_5$ of the crude phosphate, was 91%.

Example 8

50 parts of Morocco phosphate were mixed with 11 parts of ammonium chloride (both products having a particle size larger than 0.2 mm.). Then 56 parts of sulfuric acid (85%) were added to this mixture in a mixing apparatus. The mixture was allowed to age for 12 hours at a temperature of about 100° C. After heating to 350° C., the hydrogen chloride was completely expelled in 15 minutes. The reaction product was crushed to a particle size larger than 1 mm. and treated for 6 to 8 hours with the same amount by weight of $H_2O$ at 95° C. After filtering off the calcium sulfate the yield amounted to 96% of soluble $P_2O_5$ ($NH_4H_2PO_4$), calculated on the content of $P_2O_5$ of the crude phosphate.

Example 9

50 parts of Florida phosphate were ground and simultaneously intimately mixed with 7 parts of potassium chloride and 5 parts of ammonium chloride till the mixture had a particle size larger than 0.2 mm. Then 50 parts of sulfuric acid (70%) were admixed carefully and the mixture was allowed to age for 24 hours at temperatures above 100° C. The hydrogen chloride was expelled and the soluble phosphates extracted as described in Example 8. The yield of soluble $P_2O_5$ amounted to 94%, calculated on the basic amount of phosphate.

We claim:
1. A method for producing substantially purified soluble alkali, alkaline earth metal or the ammonium salt of an ortho phosphoric acid comprising reacting in finely divided form crude phosphate mineral with a mixture of
   (1) a non-volatile inorganic acid selected from the group consisting of sulfuric and phosphoric acid and
   (2) at least one of an alkali metal salt, alkaline earth metal salt, and a mixture of at least one metal salt with an ammonium salt, the salt being of a volatile inorganic acid having as an anionic group a member selected from the group consisting of halo and nitro, the concentration of (1) and (2) respectively varying from stoichiometric amounts by no more than 15% by weight, heating the crude phosphates, maintaining the salts and acid reactants at a temperature of about 200–600° C., and extracting the resulting products, adjusting the concentration ratio and the pH stepwise during extraction.
2. The method of claim 1 in which, following the reaction, the mixture is aged at temperatures not exceeding about 200° C.
3. The method of claim 1 wherein the salt of the volatile inorganic acid is reacted with the non-volatile inorganic acid in a first stage of the reaction, the volatile inorganic acid escaping in the dry and pure state, and admixing and reacting the remaining product with the crude phosphate mineral.
4. The method of claim 1 wherein extraction is carried out after the reaction of (1) and (2) and the resulting volatile acid by-product is expelled by heating after extraction.
5. The method of claim 1 in which the extraction is carried out at temperatures ranging from about normal temperature to about 150° C. and under pressures ranging from atmospheric pressure to about 10 atmospheres gage.
6. The method of claim 1 in which the solid starting components are present in particle sizes below about 0.2 mm.
7. The method of claim 1 in which the method is carried out by first adding part of the non-volatile inorganic acid and reacting the product obtained after heating with the remaining amount of non-volatile acid.
8. The method of claim 3 wherein an additional amount of component (2) is added after expulsion of a volatile inorganic acid by-product.

References Cited by the Examiner

UNITED STATES PATENTS

| | | | |
|---|---|---|---|
| 2,885,265 | 5/1959 | Cunningham | 23—165 |
| 2,893,834 | 7/1959 | Richardson | 23—109 |
| 2,914,380 | 11/1959 | Vickery | 23—109 |
| 2,954,275 | 9/1960 | Carothers et al. | 23—109 |
| 3,078,156 | 2/1963 | Yamaguchi | 23—109 |

OSCAR R. VERTIZ, *Primary Examiner.*

MAURICE A. BRINDISI, *Examiner.*

H. T. CARTER, O. F. CRUTCHFIELD,
*Assistant Examiners.*